United States Patent

Wood et al.

[15] 3,650,045
[45] Mar. 21, 1972

[54] PROJECTED VISUAL TRAINING AID

[72] Inventors: Gerald F. Wood, Vestal; Paul E. Green, Harpursville, both of N.Y.

[73] Assignee: Singer-General Precision, Inc., Binghamton, N.Y.

[22] Filed: Nov. 10, 1969

[21] Appl. No.: 875,255

[52] U.S. Cl. ............................................. 35/12 N, 35/10.2
[51] Int. Cl. .......................................... B64g 7/00, G09b 9/08
[58] Field of Search ..................... 35/12 L, 12 N, 10.2, 12 K; 353/11, 22; 235/150.26

[56] References Cited

UNITED STATES PATENTS

| | | |
|---|---|---|
| 3,398,636 | 8/1968 | MacLachlan............................353/22 |
| 3,433,479 | 3/1969 | Huck et al.............................353/22 X |
| 3,256,773 | 6/1966 | Perdue...................................353/11 |
| 3,416,857 | 12/1968 | Lookabaugh.........................353/11 X |
| 3,486,010 | 12/1969 | Pressiat...............................235/150.26 |
| 2,885,792 | 5/1959 | Hemstreet.............................35/12 K |

FOREIGN PATENTS OR APPLICATIONS 759,516   10/1956   Great Britain .........................35/12 N

*Primary Examiner*—Robert W. Michell
*Assistant Examiner*—L. R. Oremland
*Attorney*—Francis L. Masselle, William Grobman and Charles S. McGuire

[57] ABSTRACT

Apparatus providing a visual reference to assist in training a student operating a fixed-base aviation trainer in performing runway approaches and landings. The apparatus comprises a plurality of members movable to form cooperatively a two dimensional figure and means for projecting an outline of the figure on a vertically disposed display surface for viewing by the student. The visible outline conforms to a two dimensional projection on a vertical plane of the apparent shape of a runway as seen in perspective from an aircraft making a landing approach. The members are moved in accordance with simulated movement of the trainer so that the projected outline properly reflects apparent changes in the trainee's positional viewpoint with respect to the simulated runway.

8 Claims, 11 Drawing Figures

3,650,045

PROJECTED VISUAL TRAINING AID

This invention relates to visual training aids and, more specifically, to electro-mechanical means for producing a changeable geometric outline which is projected on a display surface to provide a visual stimulus simulating apparent changes in positional viewpoint.

For many years fixed-base vehicle trainers and simulators of varying degrees of complexity have been used to assist in instructing students in certain phases of the operation of actual vehicles. In order to add to the realism of the training, some of these training devices have been equipped with, or used in conjunction with, means giving a visual impression of the actual appearance of certain features of the real world. Such visual simulation systems have been provided in a variety of forms and include systems both with and without means for visually simulating apparent changes in the positional viewpoint of the observer with respect to the visual display. For example, certain moving picture visual systems are provided with variable optical elements to distort the displayed scene in a controlled manner so that the student's apparent positional viewpoint with respect to the scene is not limited to the path followed by the camera as the scene was photographed. Other visual systems have utilized television displays with the camera moved relative to a terrain model in response to simulated movement of the vehicle trainer. Such visual simulators provide a very high degree of realism but are prohibitively expensive except in connection with large, sophisticated and also very expensive training equipment.

In U.S. application Ser. No. (Case B-2775), filed of even date and commonly assigned with the present application, there is disclosed a visual training aid comprising a plurality of mechanical members in the nature of elongated bars joined together for cooperative movement and arranged for direct viewing by a trainee in a fixed-base vehicle trainer. The mechanical members form a geometric outline conforming to a two-dimensional projection on a vertical plane of the appearance of a typical aircraft runway as seen in perspective from a predetermined distance and elevation, looking generally along the runway length. A visual impression of lateral deviation of the simulated position of the aircraft from alignment with the runway axis is provided to the trainee by slewing the mechanical members about a joint at the simulated vanishing point of the runway.

While the visual training aid disclosed in the above mentioned co-pending application is very low cost, simple and reliable in operation, as well as quite effective in training value for a specific application, the present invention provides a system of greater versatility and more compact design while remaining relatively inexpensive. The present invention also makes use of the fact that a generally trapezoidal outline on a vertical display surface may be used to create a visual impression of a runway viewed in perspective. However, rather than providing an array of mechanical members defining a trapezoidal outline for direct viewing by the trainee, a projected image of such an outline is provided on a vertical screen, or other display surface. The apparatus includes suitable projection means, such as a standard overhead or opaque projector, for example, and a plurality of blades cooperatively defining the outline which is projected on the screen. Individual motive means are provided for the blades so that the size and shape of the outline may be altered in a controlled manner in accordance with the simulated position of the trainer with respect to the runway represented by the projected outline.

A principal object of the invention is to provide an effective, yet inexpensive, visual training aid for a fixed-base flight trainer utilizing a projected image.

Other objects are: to provide a training aid in the nature of a two-dimensional outline projected on a vertical surface and changeable to give a visual impression of change in the viewer's position with respect to a fixed object represented by the outline; to provide an inexpensive visual aid for use with a fixed-base flight trainer which gives a visual impression of change in positional viewpoint in any of several degrees of freedom; and, to provide a visual training aid comprising conventional still-projection apparatus with relatively simple and inexpensive modifications which simulates continuous changes in the positional viewpoint of the observer.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

Figure 1:
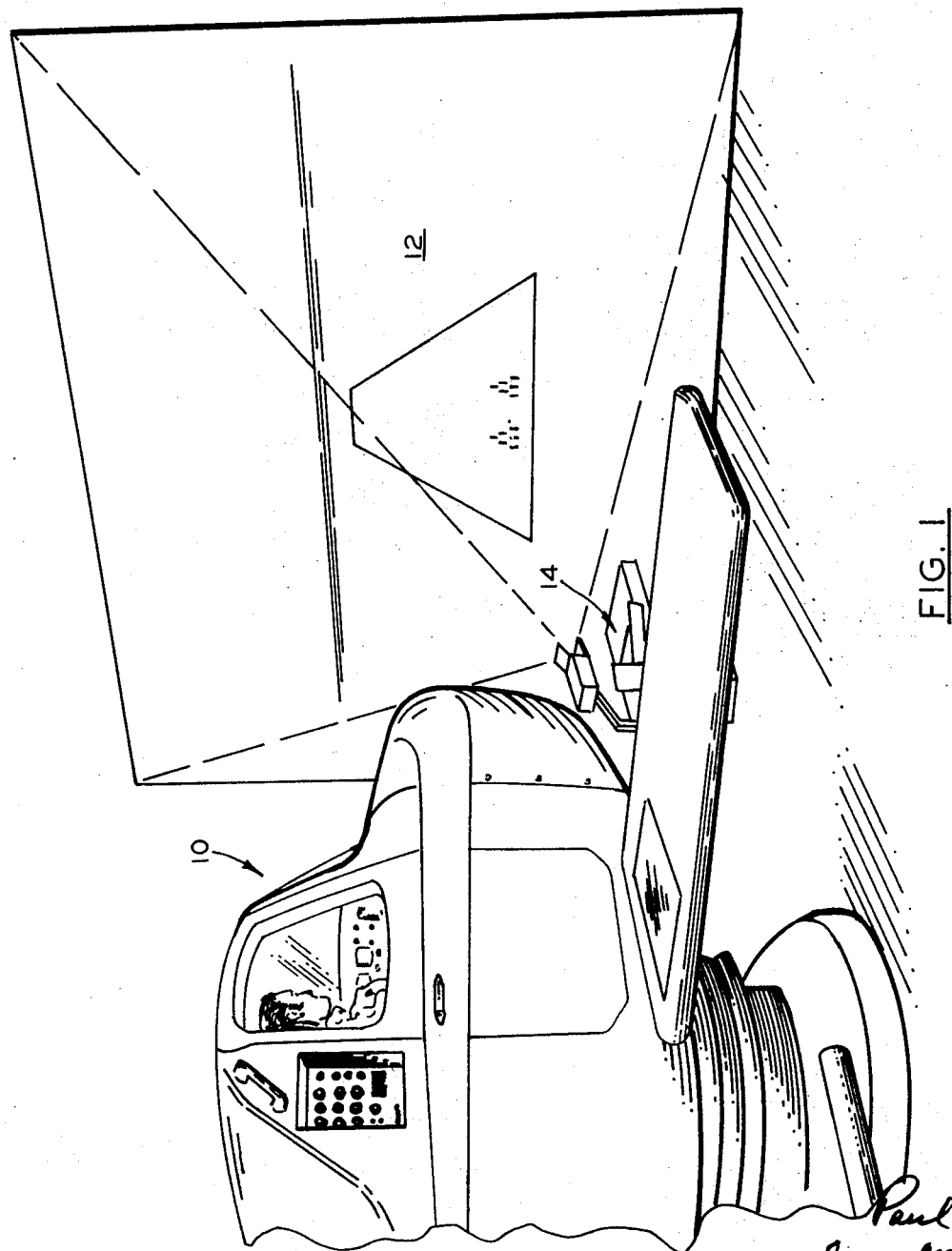
FIG. 1 is a perspective view showing the general environment of a typical employment of one embodiment of the invention.

The general environment of one embodiment of the invention is illustrated in FIG. 1 which shows a conventional light aircraft trainer 10 positioned in generally facing relation to vertical display surface 12, such as a front-projection screen for receiving a projected image from projection apparatus indicated generally by the reference numeral 14. Trainer 10 may be of any well-known design, such as that manufactured and sold by the Link Division of Singer-General Precision, Inc. under the trade designation GAT-1, but the principles of the invention may be applied in connection with a wide variety of such training apparatus, as will be apparent to those skilled in the art. The simulated cockpit of the trainer is mounted on a fixed base, but may be movable relative thereto over a limited range in one or more degrees of freedom by any of a number of well-known motion systems. At any rate, manually operable controls will be provided in the cockpit of trainer 10, simulating those of an actual aircraft so that the student may "fly" the trainer in a manner calculated to provide useful training in certain phases of operation of an actual aircraft.

Projection apparatus 14 is positioned between trainer 10 and screen 12, in the illustrated embodiment, in a location not visible to a student seated in the cockpit. However, many other suitable arrangements of the projection apparatus relative to the trainer and screen are possible, such as above or to one side of the trainer or on the opposite side of a rear-projection screen. The distance between the trainer and screen, and the size of the image displayed on the screen in the manner disclosed hereinafter are such that the appearance of the image to a student in the trainer is appropriately proportionate to the appearance of an actual runway seen in perspective from an actual aircraft during approach and landing.

Figure 2:
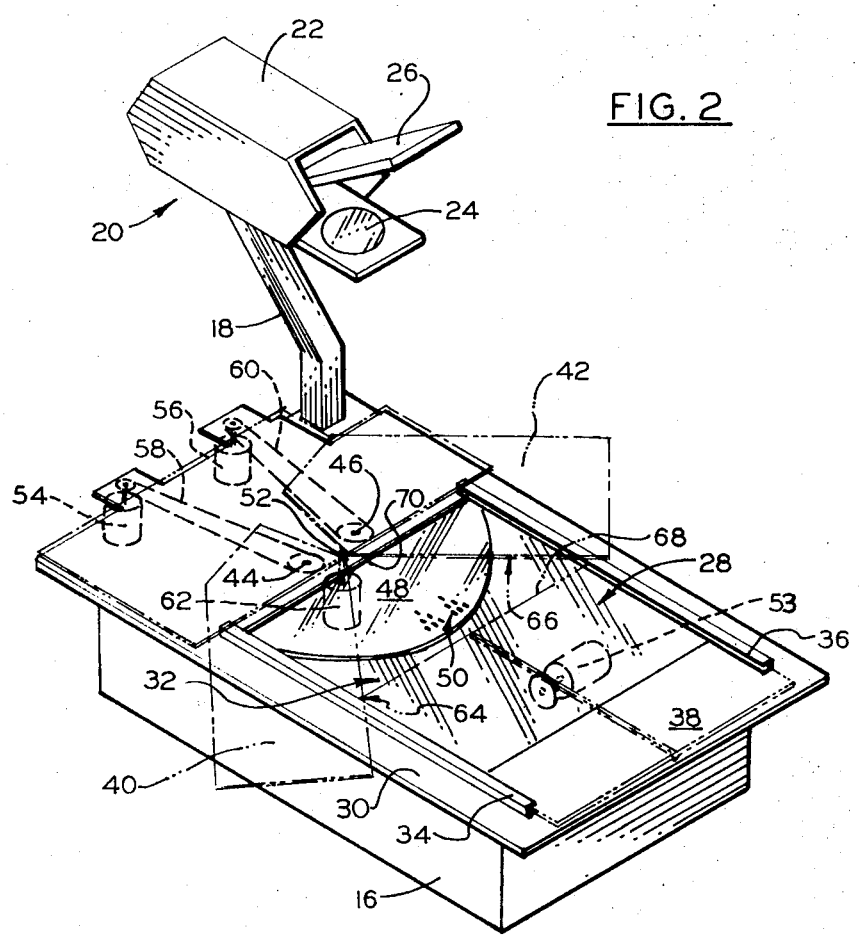
FIG. 2 is a perspective view, with portions broken away, showing an exemplary embodiment of the projection apparatus.

Details of construction of projection apparatus 14 are shown more clearly in FIG. 2. This embodiment utilizes a number of elements of a standard, commercially available overhead projector, without substantial modification, and adds certain additional elements to provide the variable outline which is projected to the screen. The standard projector base unit 16 supports column 18 to which illumination and optics unit 20 is attached. The latter includes a standard illumination source within housing 22, objective lens 24, mounted for focusing movement in the usual manner, and mirror 26, movable to adjust the position of the projected image on the screen. Focusing mirror 28 is supported on base 16 in a horizontal plane and includes focusing means such as a series of concentric lenticules formed in the upper surface thereof, again according to conventional practice. In operation, light from the illumination source is directed to focusing mirror 28 and reflected thereby upwardly through lens 24 to mirror 26 which reflects the beam forwardly to the display surface. A focused image of opaque areas or objects interposed between the illumination source and focusing mirror 28 will thus be carried to the display surface for viewing.

Turning now to the details of the present invention provided in association with the conventional projection apparatus, fixedly attached to base 16 is stationary support plate 30 having a generally central, rectangular opening 32. Tracks 34 and 36 are affixed to plate 30 along the sides of opening 32 and serve to support plate 38 for linear, sliding movement into and out of varying degrees of covering relation to opening 32. Plates 40 and 42 are each pivotally mounted upon plate 30 for independent movement about pivots 44 and 46, respectively. Transparent disc 48, having an array of opaque markings 50, is also mounted on plate 30 for rotating movement about pivot 52.

Individual motive means in the nature of small, electrical servo motors, provided for effecting movement of the aforementioned elements, may also be conveniently mounted on plate 30. Motor 53 moves plate 38 by a rack and pinion arrangement, motors 54 and 56 are connected by endless drive chains 58 and 60, respectively, to the pivots of plates 40 and 42, and the shaft of motor 62 is connected directly to the pivot of disc 48. The illustrated drive connections are exemplary only, of course, many other common means being equally suitable. The plates are so shaped and positioned for relative movement that opening 32 may be completely covered by plates 38, 40 and 42, or partially uncovered in varying degrees with the outline of the uncovered area defined by edges 64, 66 and 68 of the movable plates and edge 70 of stationary plate 30. When the projection apparatus is in operation, light from the illumination source will be reflected from the uncovered portion of mirror 28, through lens 24 to mirror 26 and thus to screen 12 where it appears as an illuminated area conforming in shape to the outline defined by the blades.

Figure 3:
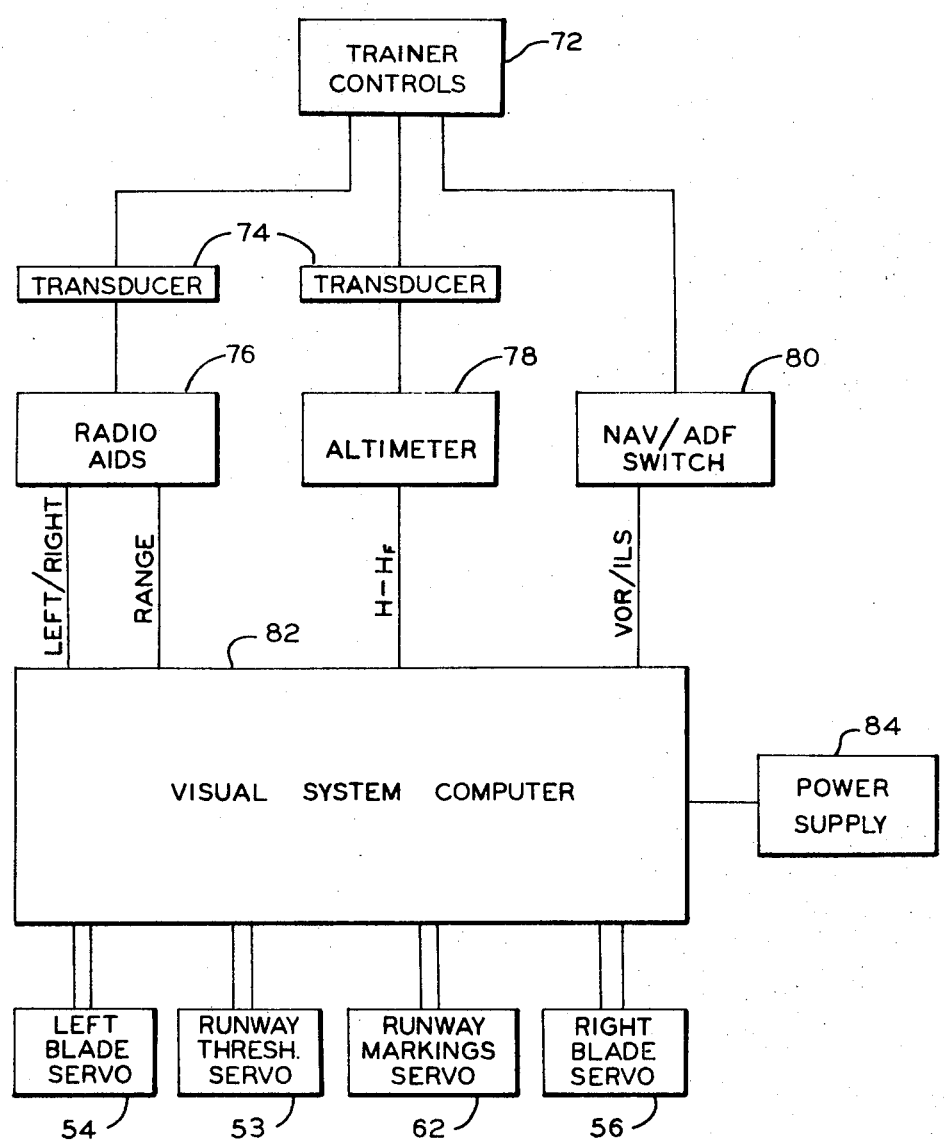
FIG. 3 is a block diagram showing the manner of interconnection of certain portions of the system.

FIG. 3 indicates in block diagram form the general electromechanical interconnections which produce a displayed image having a size and shape in proper visual conformity with the simulated position of the aircraft with respect to the landing field. Trainer controls 72, conforming substantially to the actual controls in a typical aircraft cockpit, are connected by appropriate mechanical-to-electrical transducers 74 to electrical circuits adapted to receive inputs indicating control operation and provide output signals commensurate with simulated aircraft position. Three such circuits are shown in block form, block 76 indicating a conventional circuit used in fixed-base aviation trainers to simulate radio frequency navigation equipment such as a VOR receiver and an instrument landing system. Such a circuit will provide outputs commensurate with the simulated range and bearing of the aircraft from an assumed point which in this case may be conveniently located at a desired point on the runway where practice approaches and landings are to be made.

Block 78 indicates another conventional circuit adapted to provide an output indicative of the simulated altitude of the trainer, either above sea level or above the assumed elevation of the runway. Block 80 indicates the means commonly provided for allowing the trainee to switch between VOR and ILS frequencies, thus controlling the manner of processing the inputs from VOR/ILS block 76 in a simple analog computer, indicated by block 82. The computer is designed according to conventional techniques to receive the aforementioned inputs and provide outputs of proper phase and duration to drive the servo motors, indicated by blocks in FIG. 3 bearing the same reference numerals as the actual motors shown in FIG. 2. Electrical inputs to the servo motors are reflected in mechanical movement of the disc and three blades in the manner previously described.

Figure 4A:
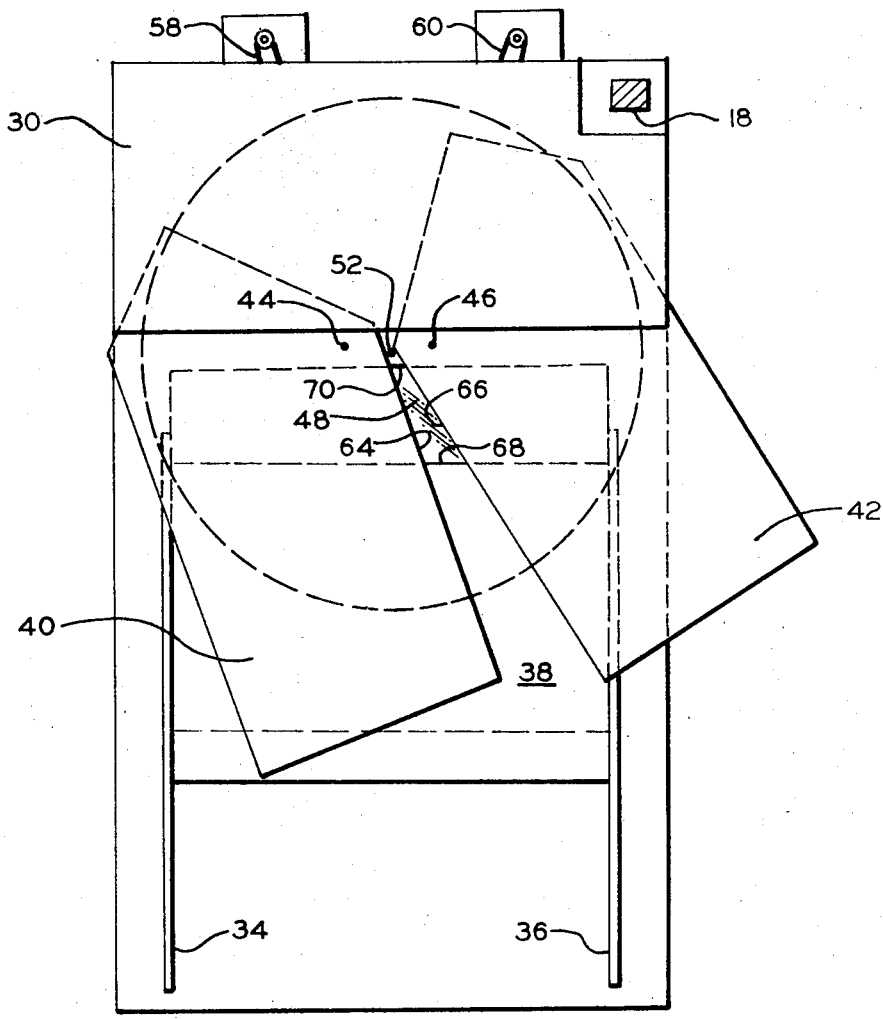
FIGS. 4a and 4b are plan views of the apparatus of FIG. 2, showing certain elements in different operational positions.
Figure 4B:
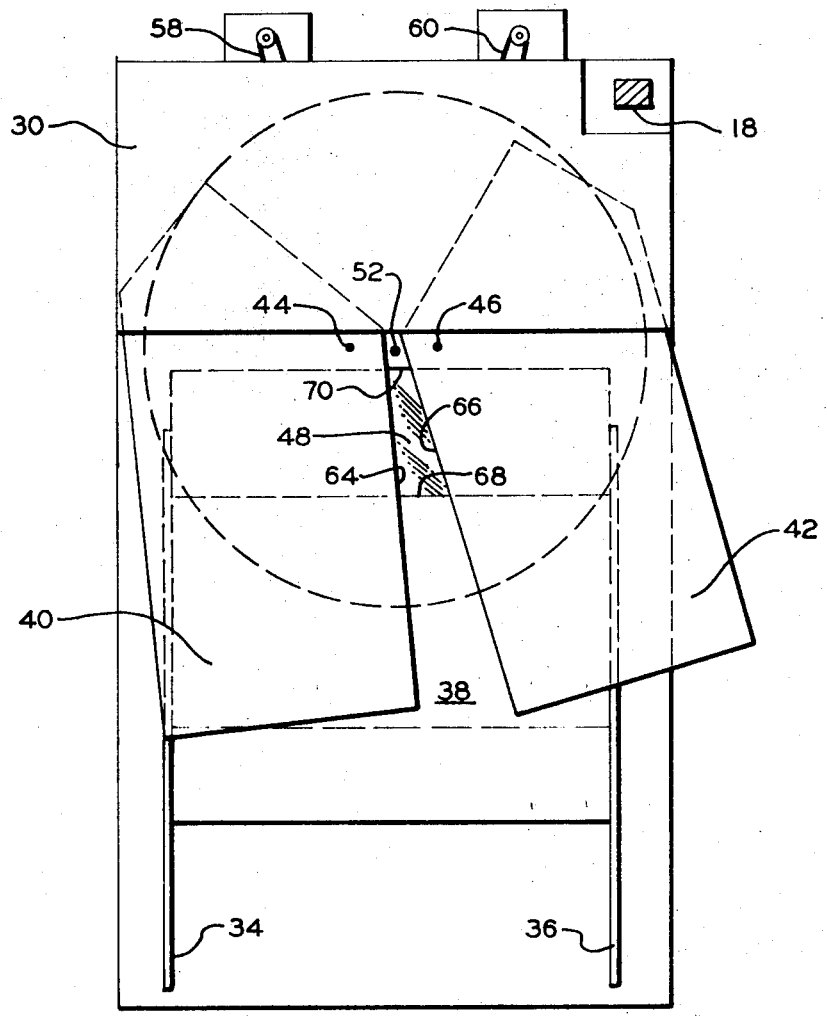

Operation of the device and the resulting visual display are indicated in FIGS. 4 and 5. FIG 4a shows the position of the blades shortly after the simulated position of the aircraft has passed the point where the runway would first be visible to the pilot. In this example, the simulated aircraft is a considerable lateral distance from alignment with the axis of the runway. As the trainee makes the necessary control movements to bring the simulated path of the aircraft into alignment with the runway for his approach, both blades 40 and 42 are rotated by their respective servo motors toward the left, as seen in the plan view, to the position shown in FIG. 4b. In the meantime, the angle between blades 40 and 42 has been adjusted, and blade 38 has been moved downwardly (i.e., away from edge 70 of opening 32), since the aircraft is assumed to have moved closer to the runway while being aligned with the axis thereof. Also, disc 48 has been rotated by motor 62 in a counter-clockwise direction so that the radial thereof which bisects markings 50 remains centered in the angle formed by edges 64 and 66 of plates 40 and 42. When the simulated position of the aircraft is such that the runway markings become visible to the pilot, plate 38 has been moved a sufficient distance to uncover markings 50, an image of which then appears in the visual display. Since disc 48 is always moved to track the position of blades 40 and 42, the markings will appear in proper alignment with the runway centerline regardless of the apparent lateral distance of the aircraft from the centerline.

Figure 5A:
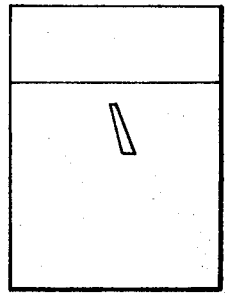
FIGS. 5a–5f are a series of elevational views showing a typical sequence of changes in the image projected by the apparatus of the invention.
Figure 5B:
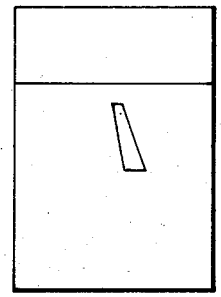
Figure 5C:
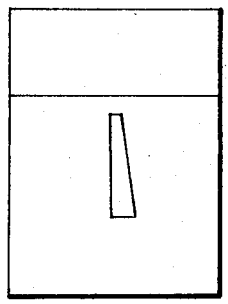

FIGS. 5a–5f illustrate a typical sequence in the appearance of the visual display during an approach and landing. The appearance of the display as shown in FIGS 5a corresponds to the appearance of the runway when it first becomes visible to the pilot. The distance of the plane from the runway when the latter first becomes visible is dependent on altitude, of course, and this is taken into account in the operation of computer 82. As the simulated position of the aircraft gets nearer to the runway, the blades are appropriately moved to cause the visual display to enlarge, as in FIG. 5b. The visual display at this point corresponds substantially to the blade positions shown in FIG. 4a and indicates to the student that his simulated path is not aligned with the runway axis. The course correction is made by appropriate movement of the trainer controls, the blade position changing to that shown in FIG. 4b, as previously described, and the resulting appearance of the visual display changing to that shown in FIG. 5c. This corresponds essentially to the appearance of the runway as seen from a distance of about three-fourths mile, at the normal altitude for that distance.

Figure 5D:
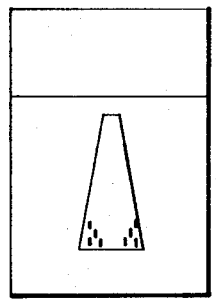
Figure 5E:
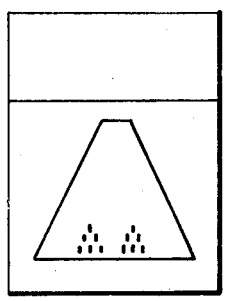
Figure 5F:
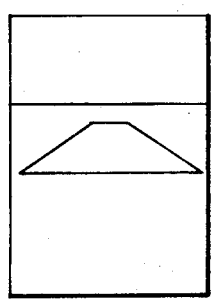

When the simulated position has been reduced to a few hundred feet, plate 38 has been moved a sufficient distance to uncover markings 50 and the visual display includes the appearance of the usual runway markings, as in FIG 5d. Naturally, other indicia may be provided on disc 48 to simulate the appearance of runway markings intended to assist the pilot in visually aligning the lateral position of the aircraft as well as judging the longitudinal point of desired touchdown. Since there is no provision in the illustrated embodiment for changing the apparent size or spacing of the markings in the visual display with respect to one another, the appearance thereof will correspond precisely to that of actual runway markings at only one simulated distance. However, this has not been found to detract significantly from the training value of the device; certainly not to an extent which would justify the added cost of modifying the equipment to include means for changing the relative spacing or size of the markings. When the simulated position of the plane approaches to within 50 feet or so of the end of the runway, the visual display will appear as in FIG. 5e. Soon after passing the point simulated by the appearance of FIG 5e, the near end of the runway is no longer visible to the pilot so blade 38 begins moving back into covering relation to opening 32. However, blades 40 and 42 continue to diverge since the simulated position of the plane is still getting nearer to the runway. FIG. 5f shows the appearance of the visual display at about the simulated point where the aircraft touches down and begins its landing roll. The plane has passed the runway markings, which are therefore covered and not visible in the display. It has been found that the maximum divergence of blades 40 and 42 which is effective to visually simulate the appearance of the sides of the runway when the plane has come to a stop is an angle of about 15° from the horizontal. That is, the angle subtended by edges 64 and 66 is about 150°.

Such features as controlled distortion of the geometric outline representing a perspective view of the runway, automatic centering of simulated runway markings as the outline is slewed laterally across the screen, and proper apparent movement of the near runway threshold during approach and landing combine to form a most effective visual training aid for the intended purpose which remains relatively simple and inexpensive. Color may be added to the display, if desired, by using an opaque projector and blades appropriately colored green and blue, for example, in the areas representing grass and sky in the visual display.

We claim:

1. A visual training aid for use in conjunction with a fixed base flight trainer to project a scene indicating apparent changes in the trainee's positional viewpoint with respect to an assumed runway to which simulated landing approaches are made, said training aid comprising:
   a. an overhead projector;
   b. a plurality of opaque mechanical members arranged to define a trapezoidal outline, said members being mounted in covering relation to the reflecting surface of said projector, said members including:
      1. a stationary member having an edge representing the upper base of said outline;
      2. a linearly movable member having an edge representing the lower base of said outline; and
      3. a pair of rotatably movable members each having an edge representing one side of said outline;
   c. a transparent disk with opaque indicia thereon rotatable about an axis between and parallel to the axes of rotation of said pair of members, and mounted in covering relation to said reflecting surface;
   d. individual servo drive means for positioning said linearly movable member, each of said pairs of rotatably movable members, and said disk; and
   e. computing means obtaining inputs from the fixed based trainer defining the simulated position of said trainer with respect to a runway and providing outputs commensurate therewith to said servo drive means to position said members to provide a proper perspective by varying said outline and to position said disk so that said opaque indicia are centered between said edges of said rotatable members.

2. The invention according to claim 1 wherein said members are flat sheets covering all of said reflecting surface other than the trapezoidal outline.

3. The invention according to claim 1 wherein said indicia simulate runway markings.

4. The invention according to claim 3 wherein said indicia are at such a radial position on said disk as to be covered by said linearly movable member at simulated aircraft positions where runway markers would not be visible.

5. The invention according to claim 1 wherein said projector is located in front of said trainer, out of view of a trainee therein, and projects its image on a front projection screen arranged to be viewed by said trainee.

6. The invention according to claim 1 wherein said servo drive means comprise conventional position servos, including a servo motor, and said disk is mounted on the shaft of its respective servo motor.

7. The invention according to claim 6 wherein said lateral member is positioned by a rack mounted thereon driven by a pinion mounted on its respective servo motor.

8. The invention according to claim 6 wherein each of said pair of rotatable members have mounted thereon, concentric with their axis of rotation, a sprocket and are positioned by an endless chain drive engaging the sprockets mounted on said members and other sprockets mounted on the shafts of their respective servo motors.

* * * * *